United States Patent
Mittal et al.

(10) Patent No.: US 9,261,913 B2
(45) Date of Patent: Feb. 16, 2016

(54) IMAGE OF A KEYBOARD

(75) Inventors: Gaurang Mittal, Gurgaon (IN); Robert Campbell, Cupertino, CA (US); Glenn A. Wong, Foster City, CA (US); Mark C. Solomon, San Jose, CA (US); Arthur Chao-Chung Wu, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 121 days.

(21) Appl. No.: 13/387,164

(22) PCT Filed: Mar. 30, 2010

(86) PCT No.: PCT/US2010/029234
§ 371 (c)(1),
(2), (4) Date: Jan. 26, 2012

(87) PCT Pub. No.: WO2011/123099
PCT Pub. Date: Oct. 6, 2011

(65) Prior Publication Data
US 2012/0120016 A1    May 17, 2012

(51) Int. Cl.
*G06F 1/16* (2006.01)
*G06F 3/0488* (2013.01)

(52) U.S. Cl.
CPC .............. *G06F 1/1643* (2013.01); *G06F 1/166* (2013.01); *G06F 1/1616* (2013.01); *G06F 1/1692* (2013.01); *G06F 3/04886* (2013.01)

(58) Field of Classification Search
CPC ... G06F 3/04886; G06F 3/048; G06F 3/0482; G06F 3/0484; G06F 3/0488; G06F 3/016; G06F 3/017; G06F 3/041; G06F 3/04842; G06F 11/3688; G06F 17/211; G06F 17/24; G06F 17/273; G06F 17/30646
USPC .................................................. 345/173–182
See application file for complete search history.

(56) References Cited

U.S. PATENT DOCUMENTS

| | | | |
|---|---|---|---|
| 6,650,318 B1 * | 11/2003 | Arnon | 345/168 |
| 2005/0225538 A1 * | 10/2005 | Verhaegh | 345/173 |
| 2005/0248525 A1 | 11/2005 | Asai | |
| 2009/0091537 A1 * | 4/2009 | Huang et al. | 345/169 |
| 2009/0146957 A1 | 6/2009 | Lee et al. | |
| 2009/0213081 A1 * | 8/2009 | Case, Jr. | 345/173 |
| 2009/0237359 A1 | 9/2009 | Kim et al. | |
| 2009/0237361 A1 | 9/2009 | Mosby | |
| 2010/0323762 A1 * | 12/2010 | Sindhu | 345/173 |

FOREIGN PATENT DOCUMENTS

| | | |
|---|---|---|
| CN | 1666170 A | 9/2005 |
| JP | 2007-183187 | 7/2007 |
| KR | 10-2009-0101741 | 9/2009 |
| WO | WO-2004-006080 | 1/2004 |

OTHER PUBLICATIONS

International Searching Authority, International Search Report and Written Opinion, Appln. no. PCT/US2010/029234, date of mailing Nov. 30, 2010, 9 p.
Extended Search Report received in EP Application No. 10849125.9, mailed Aug. 2, 2013, 7 pgs.
Communication Pursuant to Article 94(3) EPC received in EP Application No. 10849125.9 mailed on Mar. 4, 2014, pgs. 6.
Office Action, CN Application No.: 201080066022.8, Date Issued: Sep. 1, 2014, pp. 1-7.

* cited by examiner

*Primary Examiner* — Kenneth B Lee, Jr.
(74) *Attorney, Agent, or Firm* — Hewlett-Packard Patent Department

(57) ABSTRACT

A system or method including a display and sensor to detect touches of the display. The display can display an image of a keyboard. The image of the keyboard can be shaped to the locations of the touches of the display.

18 Claims, 7 Drawing Sheets

IMAGE OF A KEYBOARD

BACKGROUND

A computing device may include many different forms of input devices. The input devices may be for example keyboards or mice. A keyboard can be used for text entry or for other inputs such as direction or functions. A qwerty keyboard is a keyboard that has a specific layout for the keys to allow a user who is familiar with the qwerty keyboard to input text on the keyboard without looking on the keyboard. Portable electronics such as a portable phone may have a keyboard that is displayed on the phone. The keyboard on the phone may be displayed if the user selects an input area that is expecting text to be input.

BRIEF DESCRIPTION OF THE DRAWINGS

Some embodiments of the invention are described with respect to the following figures.

DETAILED DESCRIPTION

Keyboards may be approximately the same size and laptops may integrate a keyboard. Users of computing devices are of many different sizes. As computing devices are being designed for use by multiple users the users use the keyboard that is either incorporated in or connected to the system.

A portable phone may have a touch display that can display images and receive inputs. The portable phone may have an image of the keyboard that can be displayed on the touch screen and receive input from the touch display. The keyboard on the display of the portable phone may only be as large as the display and therefore a user may not be able 10 finger type on the portable phone because of the size of the display.

A first user may ergonomic factors such as longer fingers or wider hands than a second user and if the first and second user uses the same keyboard one of the users may be using a keyboard that is the wrong ergonomics factors for the user. In one embodiment the screen of a computing system can display a keyboard providing the correct ergonomics for the user of the system. The ergonomic can include the shape of the keyboard, of the size of the keyboard. The computing system can display the keyboard based on an input such as a users placing 10 fingers on the display.

In one embodiment, a system includes a display, a storage, and a controller. The controller can access the storage and retrieve images of a keyboard and shapes the images of the keyboard to the locations of a user's hands to display on the display. Shaping the keyboard can include, for example, curving or splitting the keyboard.

In one embodiment, a method of displaying a keyboard includes detecting an input by the computing system and displaying a keyboard on a touch display if the detected input indicates a keyboard.

Figure 1:
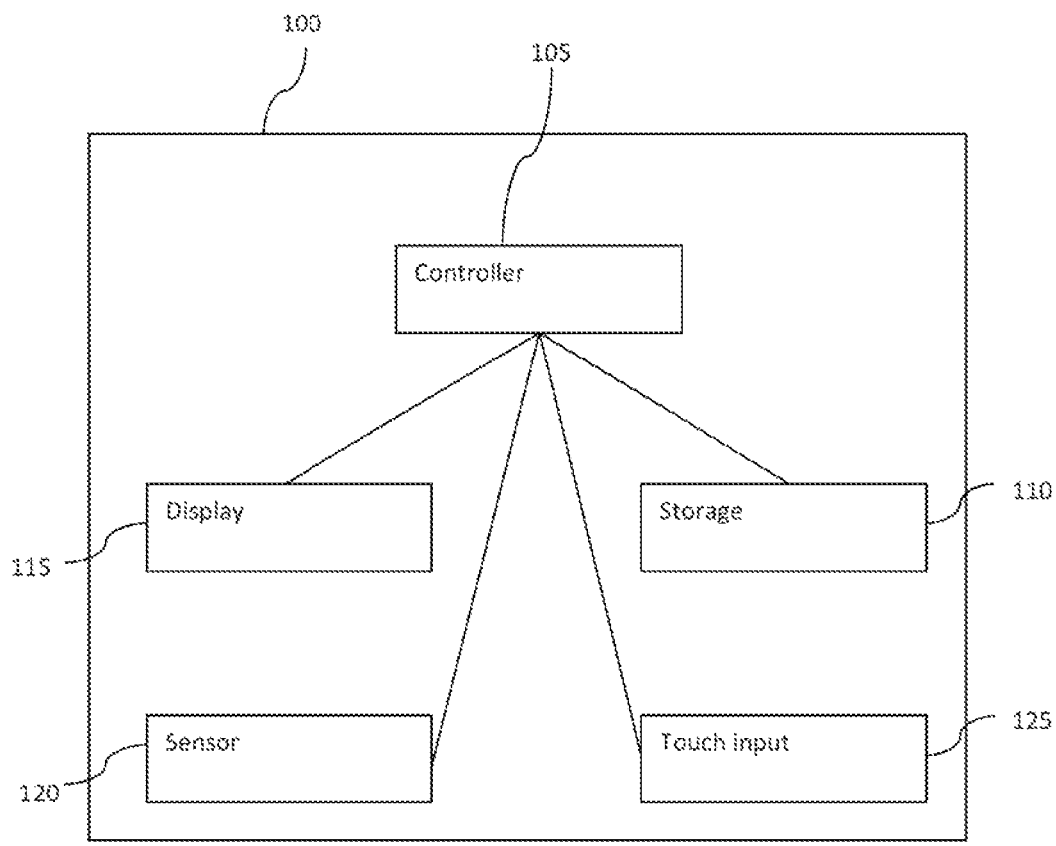
FIG. 1 is a block diagram of an example embodiment of the invention.

With reference to the figures, FIG. 1 is a block diagram of an example embodiment of the invention. The system 100 can include a display 115. The display can be for example a Liquid Crystal Display (LCD), Organic Light Emitting Diode display (OLED), Cathode Ray Tube (CRT) Display, Digital Light Processing (DLP) display, or another display technology for displaying images so that they are visible to a user. The system 100 includes a touch input 125. In one embodiment the touch input can be part of the display and in another embodiment the touch input can be a separate part of the system 100. The touch input may be for example a capacitive touch display, a resistive touch display, an optical touch display or another type of touch display. In one embodiment the touch display can detect the coordinates of the touch of the display by at least 10 individual fingers on the display.

The system 100 can include a storage 110. The storage can store images of a keyboard or may be able to store multiple images of keyboards. A controller 105 can access the keyboard images on the storage. The controller can display an image of the keyboard on the display if there is an input that causes the controller to display the keyboard. The input that causes the keyboard to be displayed may be for example a positioning of the angle of the display, the detection of fingers on the display in a keyboard configuration. The keyboard configuration may be for example the fingers in a home row position such as when the fingers are on the a, s, d, f, j, k, l, and semicolon key images.

If the keyboard is displayed by the computer when there is an input the keyboard may be displayed at a default size and shape. The controller 105 may detect the size and position of the fingers thought the touch input. The controller 105 may determine the spacing between the fingers as well as the angle of row of fingers and in one embodiment the length of the fingers from data received from the touch input.

The controller 105 can use the data determined about the fingers and adjust the image of the keyboard on the display 115. The image of the keyboard may be adjusted by curving the keyboard or splitting the keyboard so that the keyboard is positioned under the fingers. When the image of the keyboard is positioned under the fingers the controller can receive inputs from the touch input and input the text of the image that corresponds to the coordinates where the touch occurred on the display.

In one embodiment the keyboard is repositioned if the controller receives information that the fingers are in the home position. If the user moves a finger in the keyboard stays in its shape and size. For example if the user moves their index finger from the F key to the R key the keyboard does not move so that the keyboard is not repositioned or resized while the user is in the middle of typing on the keyboard. If the finger on the R key returns to the F key while the other fingers remain on the A, S, D, J, K, L, and semicolon the controller may detect that the fingers are in a home position and then detect the positions of the fingers and adjust the keyboard to the positions of the fingers. In another embodiment the user can initiate an adjustment of the keyboard images. For example the user may signal the computer to adjust the position of the keyboard based on the position of the fingers on the display or the user may adjust the keyboard by dragging the keyboard on the display to a new position or zooming in or out on the keyboard to change the size of the keyboard image.

The storage 110 can be updated with other keyboard images such as different languages, shapes, colors, translucence. The user may be able to select the keyboard image that is used, in one embodiment. In one embodiment the controller selects the best keyboard shape from those available and then adjusts it to then adjusts the images of the keyboard to the size and position of the user's fingers.

Figure 2:
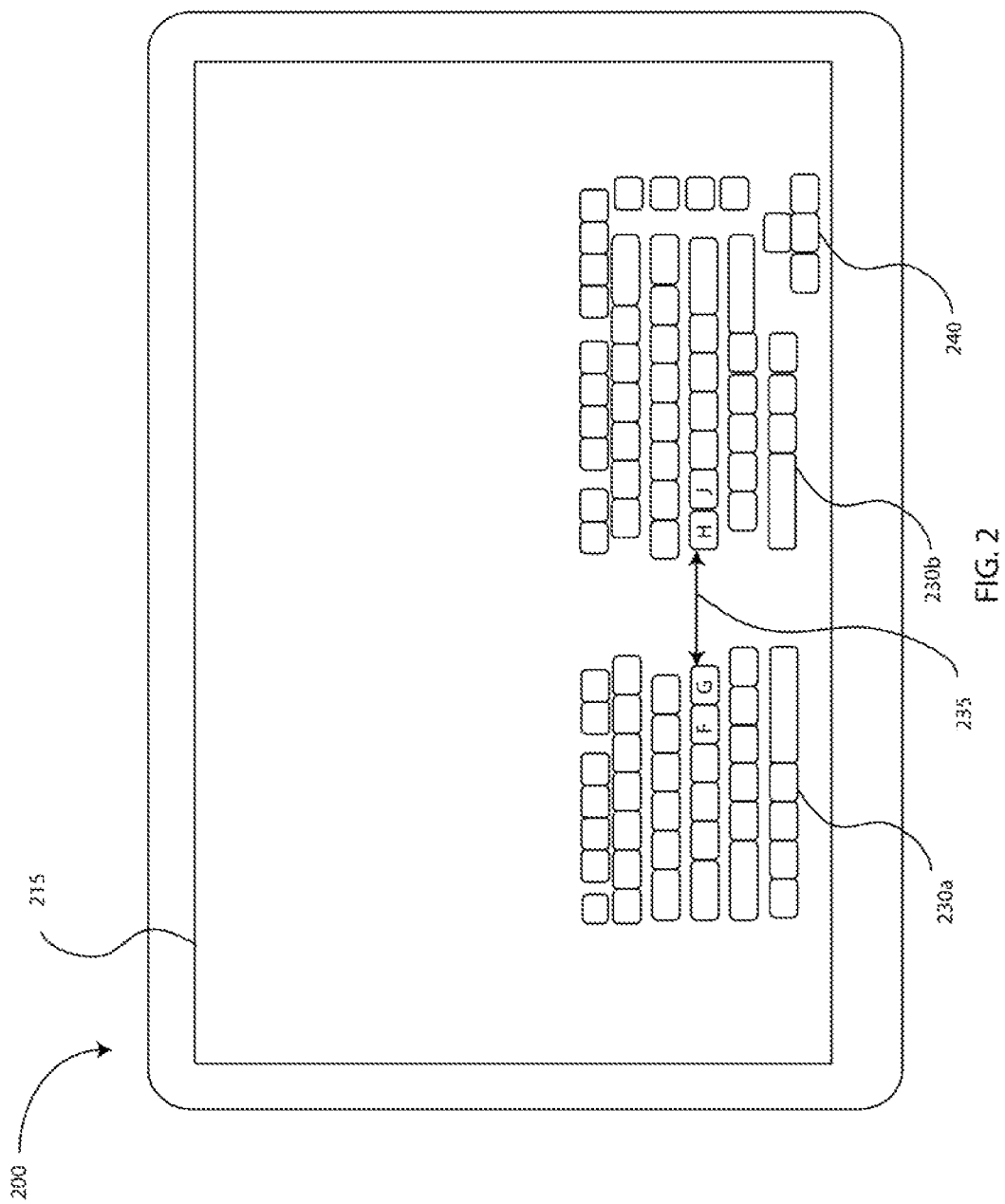
FIG. 2 is a system according to an example embodiment of the invention.

FIG. 2 is a system according to an example embodiment of the invention. The system 200 can include a display 215. The display 215 can display images. If a text input is required the system can display a keyboard on the display 215 of the system 200. In one embodiment the keyboard can be split into multiple parts. For example the keyboard can be split between the g and h keys into keyboard 230a and 230b.

In one embodiment each portion of the keyboard 230a and 230b are move to so that there is a space between the keyboard 230a and 230b. In an alternative embodiment the keys on each side of the split 235 are extended so that the keyboard appears to be continuous while the keys on the keyboard 230a and 230b that are not the keys on each side of the split such as f and j are further apart.

In one embodiment the image of the keyboard can include different keys. For example the image of the keyboard may include directional keys 240 or the image of the keyboard may include a number pad. In one embodiment the number pad is not displayed until the user moves there hand to an area of the keyboard to the right of the displayed keyboard 230a and 230b.

Figure 3:
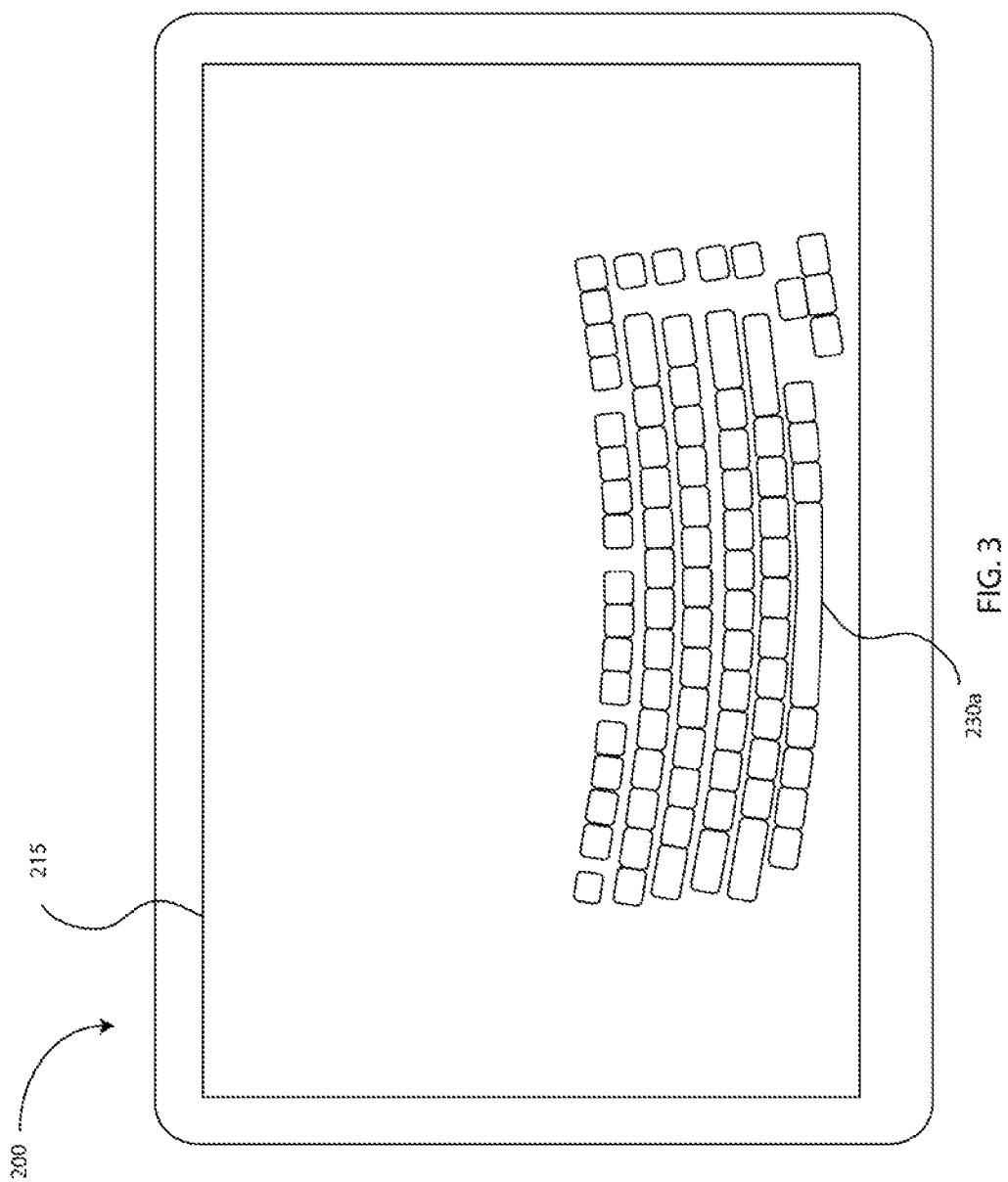
FIG. 3 is a system according to an example embodiment of the invention.

FIG. 3 is a system according to an example embodiment of the invention. The system 200 can include a display 215. The display 215 can display images. If a text input is required the system can display a keyboard on the display 215 of the system 200. In one embodiment the keyboard can be curved to match the placement of the user's fingers.

In one embodiment the keyboard may be curved in a portion of the keyboard and the remaining portions of the keyboard may be straight. In an alternative embodiment the keyboard may be curved though its length.

The keyboard may be both split and curved to accommodate the position of the user's hands on the display. The keyboard may be curved with the ends of the keyboard further from the user or the keyboard may be curved with the ends of the keyboard closer to the user.

In one embodiment a controller may determine if a curved or split keyboard would be more ergonomic for a user from the placement of the contact with the images of the keys, the size and placement of the users hands, the size of the display, the width of the user between the user's shoulders or other that may be received by the controller. For example if the user consistently touches a key on the keyboard in the upper left corner of the key the controller may suggest that the keyboard be curved or may automatically curve the keyboard. The user's hand positions or shoulder width may provide an input that causes the controller to suggest that the keyboard be split so that the user's hands are in an ergonomic position.

Figure 4:
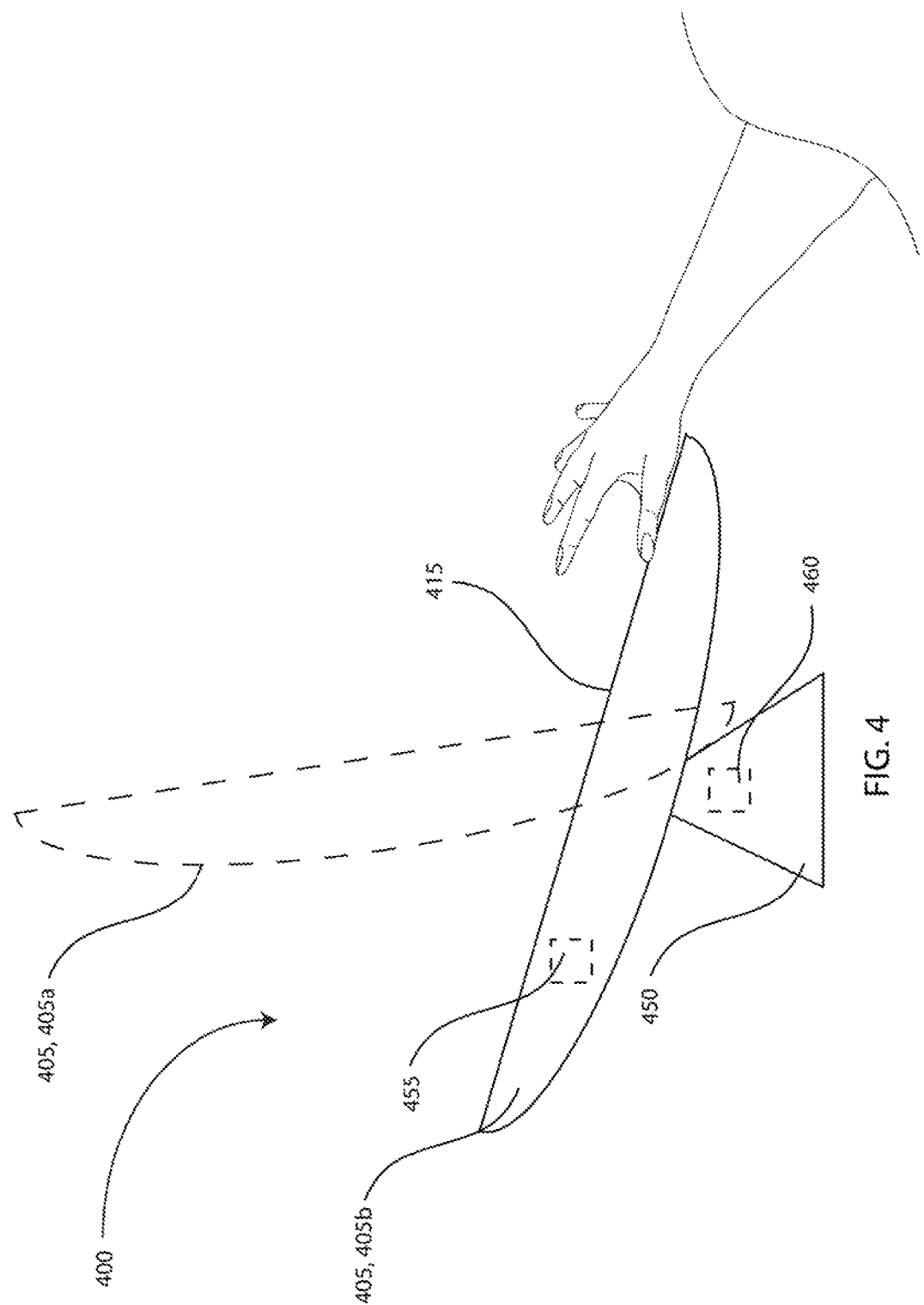
FIG. 4 is a system according to an example embodiment of the invention.

FIG. 4 is a system 400 according to an example embodiment of the invention. The system 400 can include a display 405 that is attached to a base 450. The base may allow the display 405 to be repositioned. For example the display 405 may be positioned in a first position 405a or a second position 405b.

The display 405 may include an accelerometer 455 that may generate data that can be used by the system 400 to determine the position of the display 405. If for example the display is in a first position 405a and the user wants to enter text the display may be adjusted to a second position 405b. If the system 400 determines from the accelerometer 455 that the display 405 is in the second position 405b the system may display a keyboard on the display surface 415. If the system is moved back to the first position 405a the system may discontinue the display of the keyboard on the display surface 415.

In another embodiment the base 450 of the system 400 may include a sensor 460 to generate data that can be used to determine the position of the display 405 relative to the base 450. The data from the sensor can be used by the system to determine if the display 405 is in a position to display a keyboard on the surface 415 of the display 405. The sensor 460 may be attached to the display 405 or the base 450.

The accelerometer 455, the sensor 460 or another type of sensor or a combination there of may be included in the system 400 to determine the position of the display 405. If the system 400 is placed on surface that is sloped toward the user for example a sensor 460 in the base 450 may not be able to determine the position of the display 405 relative to the user without another sensor such as an accelerometer 455 that is not dependent on the surface that the base contacting.

In one embodiment the a first position 405a and a second position 405b may be used to determine if the display is in a position that a keyboard can be displayed but may not display the keyboard until another input is determined. For example the system 405 may not display the keyboard in the first position 405a but may be able to display the keyboard in the second position 405b but waits for another input before displaying the keyboard on the surface 415 of the display 405. The other input may be for example moving the cursor on the display to an area on the display that is for text input such as a text box or may be placing the hands on the display in a 10 key configuration ready to type.

Figure 5:
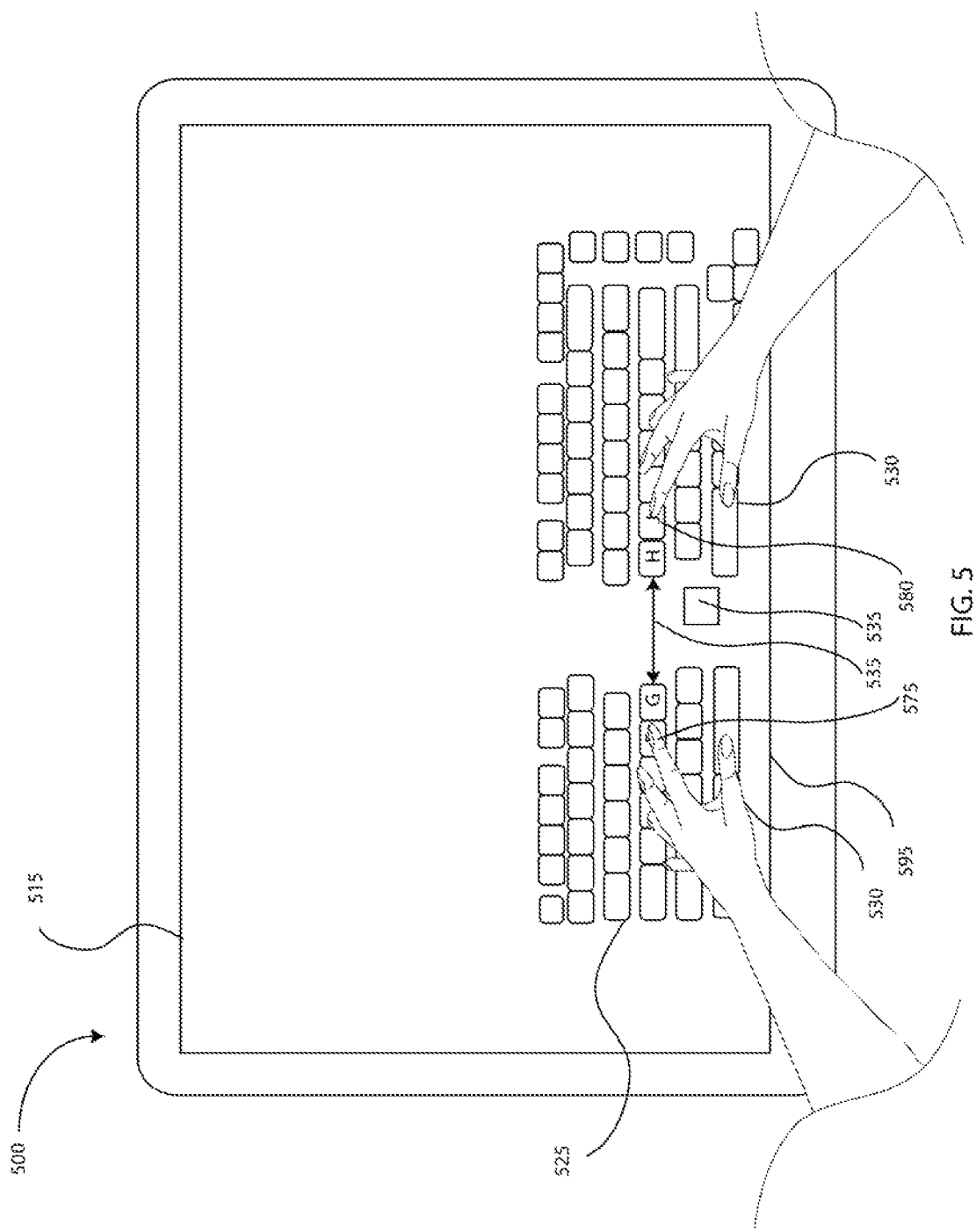
FIG. 5 is a system according to an example embodiment of the invention.

FIG. 5 is a system according to an example embodiment of the invention. The system 500 can include a display 515 and a touch input 525. The touch input can be the entire display 515 or maybe just a portion of the display 515. If for example the touch input 525 is a portion of the display 515 the touch input can be the area that is displaying a keyboard 530 on the display 515. In one embodiment the display 515 includes icons, windows or other images that the keyboard or may be placed in front of. If the keyboard is placed in front of images the other images may not be selectable by touch to reduce the chance of accidentally activating one of the icons well using the keyboard. For example if an icon 585 is as a whole in the area 535 between a split keyboard that icon may be inactivated while the keyboard is visible or if the keyboard is within a certain distance of the icon 585.

In one embodiment the hands of a user may be a normal position 570 for typing on a QWERTY keyboard 530. The keyboard 530 can adjust the area 535 between the split keyboard 530. In one embodiment the system 500 determines where the right portion of the keyboard image is placed on the display according to the location of the index finger of the user and places the key, for example the F. key, that would be under the index finger in a resting or home position of a user using a QWERTY keyboard. Additionally the system 500 can also determine where the left portion of the keyboard 530 image is placed on the display 515 according to the location of the index finger of the user and places the key, for example the J. key, that would be under the index finger and arresting or home position of the user using a QWERTY keyboard.

In one embodiment the system 500 determines from the touch input of additional fingers whether the keyboard image 530 should be curved or if each side of a split keyboard image should be at an angle. For example, if the index finger of a user's right-hand or left-hand is closer to the bottom edge 595 of the display 515 than the users pinky finger, the system 500 may determine that the keyboard should be curved or angled so that the user's index finger and pinky finger or any other fingers would be at the home position on the keyboard image 530 is initially placed on the display 515.

Figure 6:
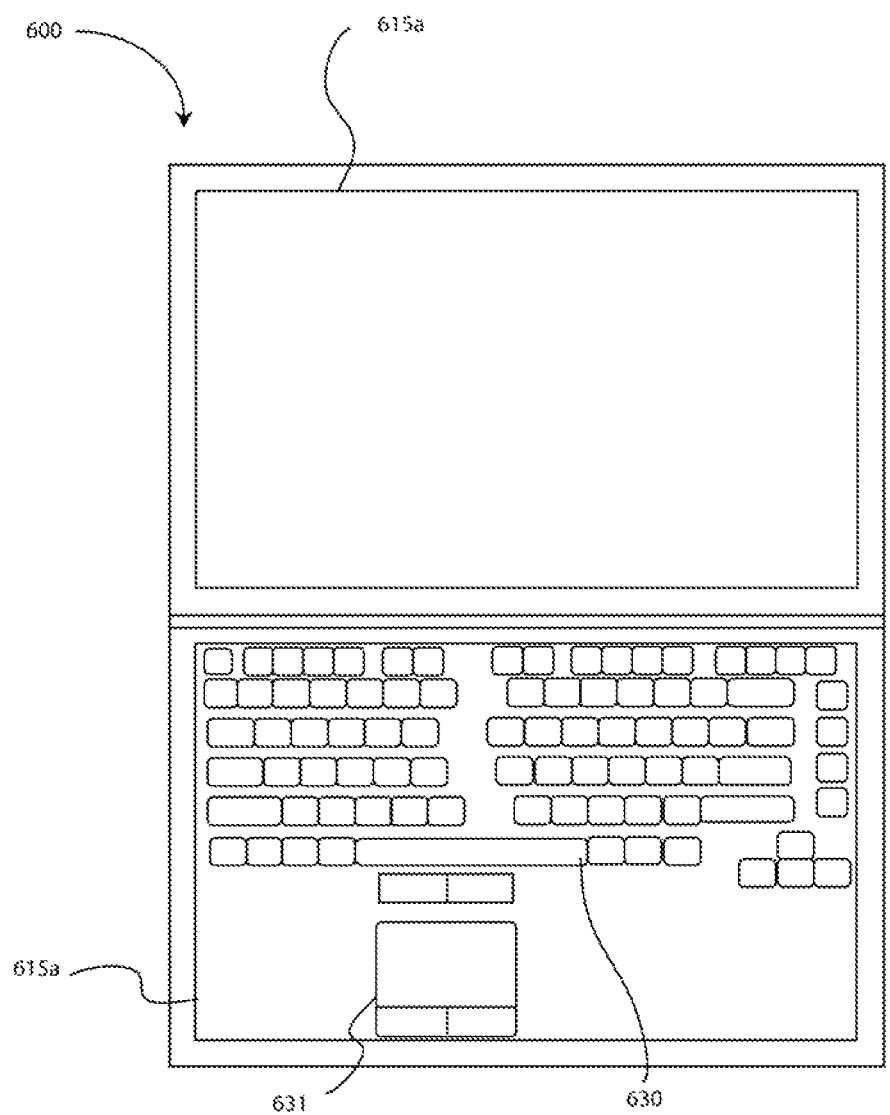
FIG. 6 is a system according to an example embodiment of the invention.

FIG. 6 is a system according to an example embodiment of the invention. The system 600 includes a first display 615a and a second display 615b. The system 600 can be for example a portable computing system such as a notebook, a personal digital assistant, phone or another portable computing device. The first display 615a may be used for displaying images for example icons or windows. The second display 615b may be used for displaying a keyboard 630 or another input device. For example the second display 615b may display an image of a touchpad 631. A user may be able to control a cursor on the first display 615a with the image of the touchpad 631 on the second display 615b. The touch input can detect a user contacting keys of the image of the keyboard 630 and also detect a user contacting a portion of the image of the touchpad 631. In one embodiment the user may be able to turn on and off the image of the touchpad 631.

Figure 7:
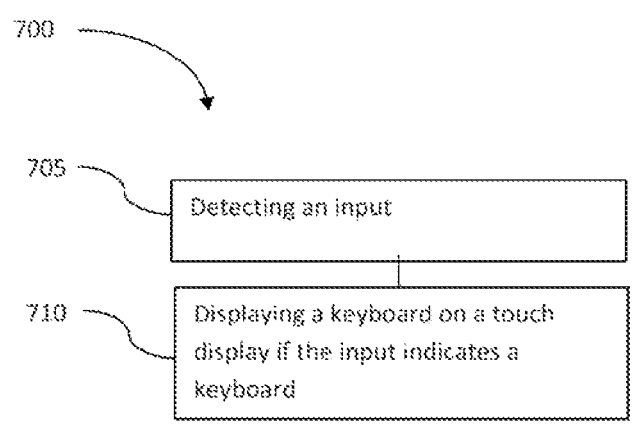
FIG. 7 is a flow diagram for an example embodiment of the method of the invention.

FIG. 7 is a flow diagram for an example embodiment of the method of the invention. The method 700 begins by detecting an input 705. The detection of the input can be by a sensor for example an accelerometer, a sensor in the base of the system performing the method, by a touch input, or another sensor. If it detected input is by the accelerometer or the sensor in the base of the system the input may be generated by a user changing the angle of the system performing the method. If the detection of the input is by a touch input in the input may be generated by a user placing their hands on a touch input display of the system performing the method.

If an input is detected a keyboard is displayed on the touch display if the input the keyboard at 710. If for example the accelerometer generates an input that indicates the system performing the method has changed positions a keyboard made the displayed on the display of the system. In one embodiment the system performing the method may include a threshold where the detection of the input occurs if the position of the system performing a method as detected by the accelerometer, a sensor in the base of the system or another sensor generates a data that corresponds to the threshold being reached. For example if the display of the system having a threshold of 45° is positioned at 45° or less from a horizontal plane the method can display an image of a keyboard.

The techniques described above may be embodied in a computer-readable medium for configuring a computing system to execute the method. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and various types of computer-readable media may be used to store and/or transmit the software modules discussed herein. Computing systems may be found in many forms including but not limited to mainframes, minicomputers, servers, workstations, personal computers, notepads, personal digital assistants, various wireless devices and embedded systems, just to name a few.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A system comprising:
   a display; and
   a set of sensors, including a first sensor to detect touch inputs on the display; and
   a controller coupled to the set of sensors to:
      provide a keyboard on the display in a first configuration, the keyboard including a first set of keys in the first configuration and being provided in a first region of the display; and
      in response to detecting a touch input, after the keyboard to include a second set of keys that are provided in a second region of the display in a second configuration, the second set of keys comprising keys different from the first set of keys, the keyboard being altered without altering the first set of keys provided in the first region,
      wherein altering the keyboard includes selecting at least one of the second region or the second configuration based on a location of the touch input.

2. The system of claim 1, wherein the keyboard of the second configuration has a curved shape relative to the keyboard of the first configuration.

3. The system of claim 1, wherein the set of sensors includes a second sensor coupled to the controller to determine an angle of the display, wherein the controller uses the sensor to detect the angle based on at least the touch input.

4. The system of claim 1, wherein the set of sensors includes one or more sensors to detect a location for each of multiple fingers of a user's hand, and wherein the controller provides the keyboard of the first configuration or second configuration when the location for each of the multiple fingers indicates that the user's fingers are in a home position.

5. The system of claim 1, wherein the second set of keys of the keyboard of the second configuration includes a number pad.

6. A method for operating a computing device, the method being implemented by one or more processors and comprising:
   providing a keyboard on the display in a first configuration, the keyboard including a first set of keys in the first configuration and being provided in a first region of the display; and
   in response to detecting a touch input, altering the keyboard to include a second set of keys that are provided in a second region of the display in a second configuration, the second set of keys comprising keys different from the first set of keys, the keyboard being altered without altering the first set of keys provided in the first region,
   wherein altering the keyboard includes selecting at least one of the second region or the second configuration based on a location of the touch input.

7. The method of claim 6, further comprising
   displaying alphanumeric text characters on individual keys of the keyboard in the first configuration and in the second configuration.

8. The method of claim 6, wherein altering the keyboard further comprises shaping the keyboard in the second configuration to be curved relative to the keyboard of the first configuration.

9. The method of claim 6, further comprising determining an angle of the display, and further comprising interpreting the determined angle as at least one of the one or more inputs.

10. A non-transitory computer readable storage medium comprising instructions that when executed by one or more processors of a computing device, cause the computing device to:

provide a keyboard on the display in a first configuration, the keyboard including a first set of keys in the first configuration and being provided in a first region of the display; and in response to detecting a touch input, after the keyboard to include a second set of keys that are provided in a second region of the display in a second configuration, the second set of keys comprising keys different from the first set of keys, the keyboard being altered without altering the first set of keys provided in the first region, wherein altering the keyboard includes selecting at least one of the second region or the second configuration based on a location of the touch input.

11. The non-transitory computer readable storage medium of claim 10, wherein altering the keyboard further comprises shaping the keyboard in the second configuration to be curved relative to the keyboard of the first configuration.

12. The non-transitory computer readable storage medium of claim 11, further comprising instructions that, when executed by the one or more processors, cause the computing device to display alphanumeric text characters on individual keys of the keyboard in the first configuration and in the second configuration.

13. The system of claim 1, wherein the keyboard in the first configuration is split into at least two portions.

14. The method of claim 6, wherein the keyboard in the first configuration is split into at least two portions.

15. The non-transitory computer readable storage medium of claim 10, wherein the keyboard in the first configuration is split into at least two portions.

16. The system of claim 1, wherein the controller discontinues providing the keyboard if the display is moved from a first position to a second position.

17. The method of claim 6, further comprising discontinuing providing the keyboard when the display is detected as being moved from a first position to a second position.

18. The non-transitory computer readable storage medium of claim 10, further comprising instructions that, when executed by the one or more processors, cause the computing device to discontinue providing the keyboard if the display is detected as being moved from a first position to a second position.

\* \* \* \* \*